(12) United States Patent
Shmilovici et al.

(10) Patent No.: US 10,833,998 B2
(45) Date of Patent: Nov. 10, 2020

(54) METHOD AND APPARATUS FOR FLOW CONTROL

(71) Applicant: MARVELL ISRAEL (M.I.S.L) LTD., Yokneam (IL)

(72) Inventors: Zvi Leib Shmilovici, Tel Aviv (IL); Gideon Navon, Tel Aviv (IL)

(73) Assignee: MARVELL ISRAEL (M.I.S.L) LTD., Yokneam (IL)

( * ) Notice: Subject to any disclaimer, the term of this patent is extended or adjusted under 35 U.S.C. 154(b) by 0 days.

(21) Appl. No.: 15/870,312

(22) Filed: Jan. 12, 2018

(65) Prior Publication Data

US 2018/0198715 A1 Jul. 12, 2018

Related U.S. Application Data

(60) Provisional application No. 62/445,664, filed on Jan. 12, 2017.

(51) Int. Cl.
| | |
|---|---|
| *H04L 12/801* | (2013.01) |
| *H04L 12/851* | (2013.01) |
| *H04L 12/721* | (2013.01) |
| *H04W 28/02* | (2009.01) |
| *H04L 12/741* | (2013.01) |

(52) U.S. Cl.
CPC ............ *H04L 47/127* (2013.01); *H04L 45/66* (2013.01); *H04L 45/74* (2013.01); *H04L 47/2483* (2013.01); *H04L 45/38* (2013.01)

(58) Field of Classification Search
CPC ....................................................... H04L 47/35
See application file for complete search history.

(56) References Cited

U.S. PATENT DOCUMENTS

| | | | | |
|---|---|---|---|---|
| 5,719,853 A | * | 2/1998 | Ikeda ................... | H04L 12/5602 370/229 |
| 2003/0107991 A1 | * | 6/2003 | Tezuka ................ | H04L 12/6418 370/229 |
| 2004/0240470 A1 | * | 12/2004 | Medved .................. | H04L 49/15 370/469 |
| 2005/0144328 A1 | * | 6/2005 | McBeath ................ | H04L 12/46 709/251 |
| 2010/0103933 A1 | * | 4/2010 | Akahane ................. | H04L 12/10 370/390 |
| 2012/0079065 A1 | * | 3/2012 | Miyamoto ............ | H04L 12/287 709/217 |
| 2012/0229296 A1 | * | 9/2012 | Ree ........................ | G01D 4/002 340/870.02 |

(Continued)

*Primary Examiner* — Hong S Cho

(57) ABSTRACT

Aspects of the disclosure provide a network device that includes interface circuitry and packet processing circuitry. The interface circuitry is configured to receive incoming packets from a network and transmit outgoing packets to the network via interfaces. The packet processing circuitry is configured to detect a congestion associated with a packet that is sent from a source device to a destination device in the network and generate a notification packet that is destined to the source device. The notification packet is indicative of a packet flow that the packet belongs to and the presence of the congestion. The packet processing circuitry is configured to send the packet to the destination device via a first interface and send the notification packet to the source device via a second interface.

23 Claims, 4 Drawing Sheets

(56) References Cited

U.S. PATENT DOCUMENTS

| | | | | |
|---|---|---|---|---|
| 2014/0098672 A1* | 4/2014 | Zhang | ............... | H04L 47/12 |
| | | | | 370/236 |
| 2014/0269271 A1* | 9/2014 | Gafni | ............... | H04L 47/35 |
| | | | | 370/230 |
| 2015/0078170 A1* | 3/2015 | Chrysos | ............ | H04L 47/115 |
| | | | | 370/236 |

* cited by examiner

METHOD AND APPARATUS FOR FLOW CONTROL

INCORPORATION BY REFERENCE

This present disclosure claims the benefit of U.S. Provisional Application No. 62/445,664, "FAST FLOW CONTROL IN L3 NETWORKS" filed on Jan. 12, 2017, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In some networks, congestion notification, such as explicit congestion notification is used to allow end-to-end notification of network congestion in a network. In an example, a first endpoint device generates packets and sends the packets to a second endpoint device. When a network congestion is detected at an intermediate node, a packet is either dropped or suitably marked and forwarded to its destination. At the second endpoint device, a congestion notification is provided by way of a returning packet (e.g., acknowledgement packet) which in turn is sent back to the first endpoint device, so that the first endpoint device is able to adjust a sending rate of packets based on the congestion notification.

SUMMARY

Aspects of the disclosure provide a network device that includes interface circuitry and packet processing circuitry. The interface circuitry is configured to receive incoming packets from a network and transmit outgoing packets to the network via interfaces. The packet processing circuitry is configured to detect a congestion associated with a packet that is sent from a source device to a destination device in the network and generate a notification packet that is destined to the source device. The notification packet is indicative of a packet flow that the packet belongs to and the present of congestion. The packet processing circuitry is configured to send the packet to its destination via a first interface and send the notification packet to the source device via a second interface.

According to an aspect of the disclosure, the packet processing circuitry include an ingress processing module configured to parse the packet, and enable a feature for generating the notification packet based on header information of the packet. In an embodiment, the ingress processing module is configured to enable the feature based on one or more fields in a header of the packet. In an example, the ingress processing module is configured to set a flag to enable the feature for generating the notification packet.

In an example, the egress processing module is configured to generate a replication packet of the packet, send the packet out of the network device and generate the notification packet based on the replication packet. In an embodiment, the egress processing module is configured to forward the notification packet to the ingress processing module to determine the second interface to send the notification packet.

According to another aspect of the disclosure, the packet processing circuitry includes an egress processing module configured to swap values in a source Internet protocol (IP) address field and a destination IP address field of the packet to form a source IP address field and a destination IP address field of the notification packet. In an embodiment, the egress processing module is configured to include one or more fields in a header of the packet into the notification packet. Further, the egress processing module is configured to fill a media access control (MAC) address of the network device in a destination MAC address field of the notification packet.

Aspects of the disclosure provide a method for congestion notification in a network. The method includes receiving, at a network device, a packet that is sent from a source device to a destination device in the network, detecting a congestion associated with the packet, and generating a notification packet that is destined to the source device. The notification packet is indicative of a packet flow that the packet belongs to and the congestion. The method further includes sending the packet to the destination device via a first interface and sending the notification packet to the source device via a second interface.

Aspects of the disclosure provide a non-transitory computer readable medium storing computer instructions for causing a processor in a network device to execute operations for congestion notification in a network. The operations include receiving a packet that is sent from a source device to a destination device in the network, detecting a congestion associated with the packet, and generating a notification packet that is destined to the source device. The notification packet is indicative of a packet flow that the packet belongs to and the congestion. Then the operations include sending the packet to the destination device via a first interface and sending the notification packet to the source device via a second interface.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Aspects of the present disclosure enable an intermediate node in a network to send a congestion notification packet (CNP) directly to a source node of network traffic for quick congestion notification. The congestion notification is indicative of a specific network traffic flow. Thus, the source node can perform flow based rate control to alleviate congestion in a flow.

Figure 1:
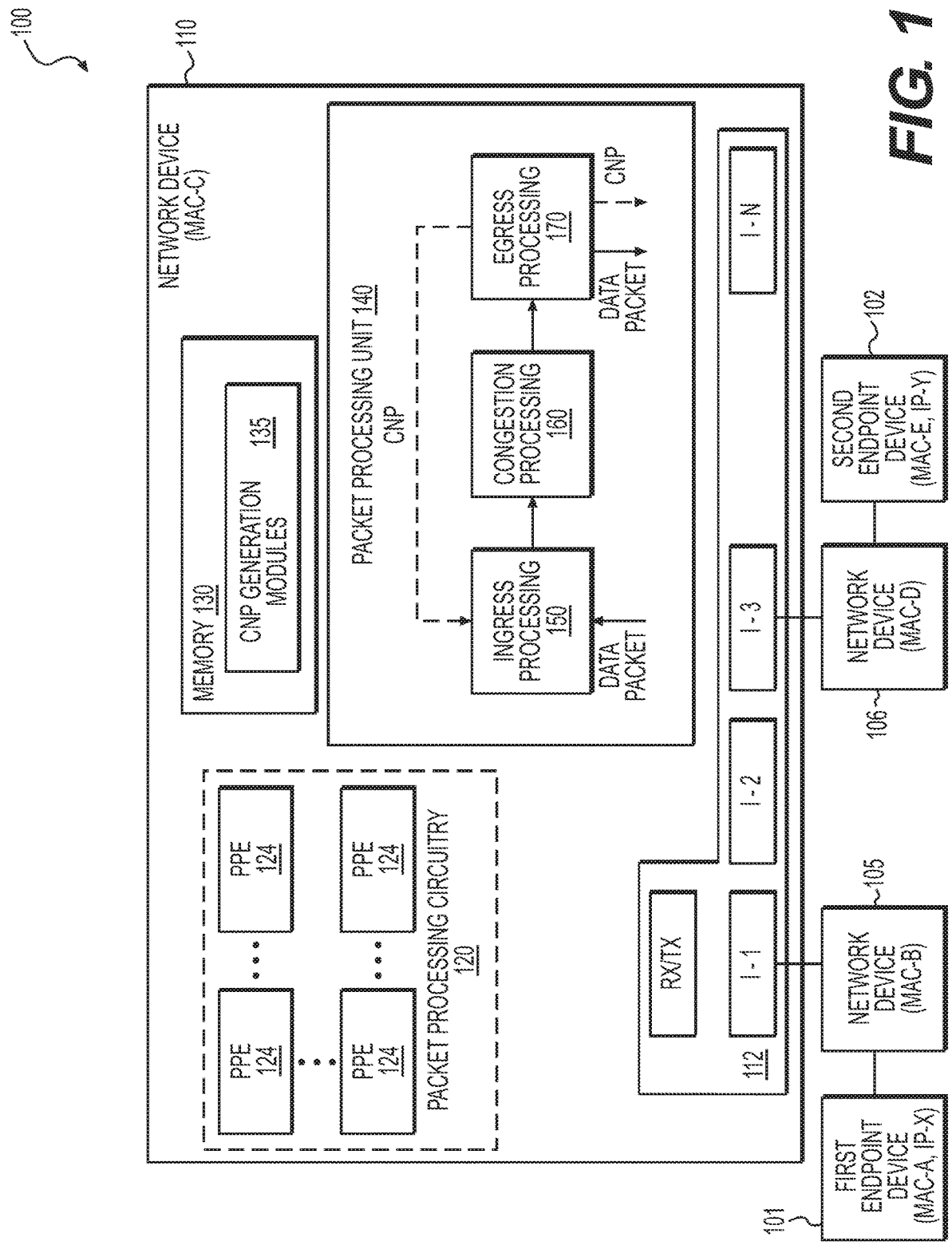
FIG. 1 shows a block diagram of a network 100 according to an embodiment of the disclosure.

FIG. 1 shows a block diagram of a network 100 according to an embodiment of the disclosure. The network 100 includes endpoint devices (end nodes), such as a first endpoint device 101, a second endpoint device 102, and the like, and network devices (intermediate nodes), such as network devices 105, 106, 110, and the like. The endpoint devices are connected to the network devices, and the network devices are interconnected to form transmission paths for the endpoint devices. Along the transmission paths, the network devices forward packets, such as packets that are originated from some endpoint devices (source devices) and destined to some other endpoint devices (destination devices). In the network 100, at least one of the network devices, such as the network device 110 in the FIG. 1 example, is configured to generate congestion notification packets that are destined to source devices to enable flow based rate control at the source devices.

For example, the network device 110 is on a transmission path from the first endpoint device 101 to the second endpoint device 102, and the first endpoint device 101 sends data packets along the transmission path to the second endpoint device 102. The network device 110 is configured to detect a congestion at least partially due to a specific packet flow of data packets from the first endpoint device 101, and to generate a new packet that is destined to the packet source in response to the congestion detection. The new packet includes a congestion notification, and is indicative of the specific packet flow. Thus, in an example, when the first endpoint device 101 receives the new packet, the first endpoint device 101 performs flow based rate control. In the example, inasmuch as the congestion notifications provided by the network device 110 arrive at the first endpoint device 101 earlier than a conventional end-to-end congestion notification from the second endpoint device 102, the first endpoint device 101 is able to react relatively quickly to the congestion. Consequently, when the latency in congestion notifications is reduced, the resultant quicker reaction of a source to notifications of buildup in upstream traffic congestion facilitates faster rate limiting of transmitted traffic. This in turn allows for reduced size of buffers needed to store overflowing traffic, and/or a reduction in the quantity of packets that are dropped.

Generally, a packet is referred to as a formatted transmission unit carried in packet-switched network, and a packet flow is referred to as a sequence of packets of a same packet type originating from a same packet source (e.g., an application in the first endpoint device 101) and being sent to a same packet destination (e.g., an application in the second endpoint device 102). A packet includes a header section and a payload section, the header section includes one or more headers corresponding to control information of one or more layers in open system interconnection (OSI) layer model, and the payload section carries data. The OSI model includes, from bottom to top, physical layer (layer 1), data link layer (layer 2), network layer (layer 3), transport layer (layer 4), session layer (layer 5), presentation layer (layer 6) and application layer (layer 7), for example. In an example, the header section includes a layer 2 header (e.g., media access control header), a layer 3 header, a layer 4 header and the like. The layer 3 header includes layer 3 control information, such as an Internet protocol (IP), a source IP address, a destination IP address, and the like. The layer 4 header includes layer 4 control information, such as a source port number, a destination port number. A port is an endpoint of communication (e.g., associated with a running application) in an operating system. In an example, when an application in the first endpoint device 101 sends data to an application in the second endpoint device 102, the data is carried in a packet flow from the first endpoint device 101 to the second endpoint device 102. Packets in the packet flow are referred to as data packets. The data packets in the packet flow have the same IP protocol, the same source IP address, the same destination IP address, the same source port number and the same destination port number. In an embodiment, a combination (5 tuples) of an IP protocol, a source IP address, a destination IP address, a source port number and a destination port number is indicative of a specific packet flow.

In the present disclosure, a stream of packets refers to packets that are generated or received at a particular device and may include packets from one or more packet flows. In an example, the first endpoint device 101 sends a first packet flow for data storage and a second packet flow for database query to the second endpoint device 102. The first packet flow and the second packet flow have the same source IP address and the same destination IP address, but packets in the respective first and second packet flows have a different source port number and a different destination port number.

According to an aspect of the disclosure, the network 100 can be any suitable network, such as a single network or a plurality of networks of the same or different types. For example, the network 100 is a data network or a telecommunications or video distribution (e.g. cable, terrestrial broadcast, or satellite) network in connection with a data network. Any combination of telecommunications, video/audio distribution and data networks, whether a global, national, regional, wide-area, local area, or in-home network, can be used without departing from the spirit and scope of the present disclosure. The network 100 includes interconnections that are implemented using any suitable network technology, such wired, wireless, a local area network (LAN), a wireless LAN (WLAN), a fiber optical network, a wide area network (WAN), a peer-to-peer network, the Internet, and the like.

The network 100 includes various endpoint devices (e.g., server devices, personal computers and the like), and network devices (e.g., switches, routers, and the like). In an embodiment, the network 100 is formed in a data center that includes server devices, network switches and routers. The server devices, the network switches and the routers are interconnected using suitable networking technology, such as Ethernet technology and the like. In the embodiment, the server devices are the endpoint devices, and the network switches and routers are network devices. A server device includes various resources, such as storage resources, computation resources, virtual machines emulating physical client devices, and the like. The server devices provide various functionalities (e.g., services), such as mail service, database service, print service, web service, game service, application service, and the like. In an example, a server device includes a network interface component, such as a network interface controller (NIC), that connects the server device to a network switch or a router in the network 100.

The devices in the network 100 are identified by addresses, such as Internet protocol address (IP address), media access control address (MAC address) and the like. A MAC address is a physical address, sometimes referred to as a Layer 2 address, that is assigned by manufacture to a network interface component, such as an NIC, a network switch, a network router, and the like. The MAC address is stored in hardware, such as a read-only memory, and the like of the network interface component, and is a unique identifier for the network interface component. In an example, an NIC installed in the first endpoint device 101 has an MAC address MAC-A, the network device 105 has an MAC address MAC-B, the network device 110 has an MAC address MAC-C, the network device 106 has an MAC address MAC-D, an NIC installed in the second endpoint device 102 has an MAC address MAC-E. The IP address, sometimes referred to as a Layer 3 address, is logical address that is assigned to a device at the time when the device is connected into a network that uses IP protocol for communication. The IP address is used in communication for identification and addressing according to IP protocol. In an example, when the first endpoint device 101 is connected into the network 100, the first endpoint device 101 is assigned an IP address IP-X, and when the second endpoint device 102 is connected into the network 100, the second endpoint device 102 is assigned an IP address IP-Y.

The network switches and the routers can be interconnected according to any suitable topology. In an example, at least one of the network switches and/or routers is connected to another network (not shown), and is configured to forward packets in and out of the network 100.

In an embodiment, the network 100 includes a mix of layer 2 devices (e.g., that switch packets based on MAC addresses) and layer 3 devices (e.g., that route packets based on IP addresses) according to the OSI layer model. In an example, the endpoint devices transmit data according to remote direct memory access (RDMA) over Converged Ethernet version 2 (RoCEv2). According to RoCEv2, the endpoint devices encapsulate data over for example, layer 4 header (e.g., UDP header), layer 3 header (e.g., IP header) and layer 2 header (MAC header). According to an aspect of the disclosure, one or more network devices, such as the network device 110 and the like, in the network 100 are configured to enable packet flow based rate control that is a function of layer 3 (L3) and layer 4 (L4) attributes according to the OSI layer model.

In some embodiments, the network device 110 can be any suitable network device, such as a network switch, a bridge, a router, a VPN concentrator, and the like that connects two or more computer systems, network segments, subnets, and so on. The network device 110 can be implemented using any suitable technology including hardware, software.

The network device 110 includes various functional circuit blocks, such as interface circuitry 112, a packet processing unit 140, memory 130, and the like coupled together for example using suitable interconnection architecture (not shown), such as a bus architecture.

The interface circuitry 112 includes suitable circuits such as transmitting circuitry TX, receiving circuitry RX, and the like to form a plurality of network interfaces I-1 to I-N. In an example, each of the plurality of network interfaces I-1 to I-N is configured to couple another suitable network device in a communication network via a respective communication link. The network interfaces I-1 to I-N can be physical interfaces or air (radio based) interfaces. In an example, the network interfaces I-1 to I-N are physical interfaces and are configured according to Ethernet technology. Ethernet cables are used to couple other devices to the network device 110 via the network interfaces I-1 to I-N. The network interfaces I-1 to I-N respectively include receiving circuits (that are parts of receiving circuitry RX) for receiving signals from the Ethernet cables and transmitting circuits (that are parts of transmitting circuitry TX) for transmitting signals onto the Ethernet cables. For example, the network interface I-1 is configured according to Ethernet technology, and an Ethernet cable is used to couple the network device 105 to the network device 110 via the network interface I-1. Similarly, the network interface I-3 is configured according to Ethernet technology, and an Ethernet cable is used to couple the network device 106 to the network device 110 via the network interface I-3.

In another example, the network interfaces I-1 to I-N are air interfaces for wireless communication, such as cellular communication, WiFi communication, and the like between the network device 110 and other devices. The network interfaces I-1 to I-N respectively include allocated radio resources, such as time, frequency, coding scheme, and the like to form communication channels for the wireless communication between the network device 110 and the other devices. The transmitting circuitry TX can transmit wireless signals that multiplex the communication channels. The receiving circuitry RX can receive wireless signals, and de-multiplex the received signals to extract information in respective communication channels.

It is noted that, in another example, some of the network interfaces I-1 to I-N are physical interfaces and others are air interfaces.

The packet processing unit 140 is configured to process packets and to determine actions, such as forwarding via a network interface, encryption/decryption, fragmentation, multicasting, and the like on the packets. The packet processing unit 140 can be implemented using any suitable technology, such as a central processing unit (CPU), a multi-core processor, application-specific integrated circuit (ASIC), field-programmable gate array (FPGA), pipeline architecture, parallel computing, and the like. In an embodiment, the packet processing unit 140 is implemented using packet processing circuitry 120. In the FIG. 1 example, the packet processing circuitry 120 includes a plurality of packet processing engines, or elements (PPEs) 124. The PPEs 124 are implemented using suitable technology. In an embodiment, the PPEs 124 are ASIC hardware engines, each of which performs a dedicated set of packet processing operations, that are suitably coupled together to form a packet processing pipeline. In another embodiment, the PPEs 124 are implemented using programmable packet processing technology in which each of the PPEs is a run-to completion processor. In still another embodiment, the PPEs are implemented as programmable engines that are coupled together as a pipeline.

In some embodiments, the PPEs 124 process packets themselves. In some embodiments, the PPEs 124 process packet descriptors (metadata) representing the packets, rather than processing the packets themselves, while packet payloads and/or packet headers are stored in a memory. A packet descriptor includes, for example portions of the header information of the packet, and/or includes information that is generated during packet processing. In some embodiments, the packet descriptor includes other information as well as an indicator of where the packet and/or the header is stored in a memory associated with the network device 110. For ease of explanation, the term "packet" herein is used to refer to a packet itself or to a packet descriptor associated with the packet.

In some embodiments, the PPEs 124 are configured to operate in parallel. In an example, each PPE 124 is configured to perform necessary processing operations (run to completion processing) of a packet. In another example, multiple PPEs 124 form a pipeline of multiple stages to process packets, and the PPEs 124 are configured to perform operations of the respective stages. Thus, different processing steps of a packet, such as parsing, encryption, forwarding and the like, are performed by different PPEs 124.

The memory 130 stores one or more of i) software instructions to be executed by components of the network device 110, such as the PPEs, and the like; ii) data to be processed; iii) packet payloads and/or packet headers during the processing of descriptors; and iv) processed packets that are to be egressed from the network device. Although depicted as a single block, in some configurations memory 130 is comprised of a plurality of different physical memories. In an embodiment, the memory 130 stores software modules 135 for CNP generation. Then, in an example, one or more of the PPEs 124 execute the software modules 135 to generate CNPs. Further, the memory 130 stores different information structures used by the packet processing unit 140, such as lookup tables, registers, data structures, instructions used by the PPEs 124. The memory 130 is implemented using any suitable storage device, such as a static random access memory (SRAM), a dynamic random access memory (DRAM), ternary content-addressable memory (TCAM), a flash memory, a solid state drive, a hard drive, an optical drive, and the like.

According to an aspect of the disclosure, the packet processing unit 140 is configured to detect a congestion associated with a packet. The packet belongs to a specific packet flow from a packet source (e.g., a running application in a source device). The packet processing unit 140 is further configured to generate a congestion notification packet (CNP) that is directly destined to the packet source and to forward the CNP to the packet source. The CNP includes information that is indicative of the specific packet flow, in an embodiment. For example, when the packet processing unit 140 detects a congestion associated with a packet that is part of a packet flow from the first endpoint device 101 to the second endpoint device 102, the packet processing unit 140 generates a CNP that is destined to the first endpoint device 101. The CNP is sent out of the network device 110 via the network interface I-1 in the example. The CNP includes information that is indicative of the packet flow, such as one or more of an IP protocol, a source IP address, a destination IP address, a source port identifier, and a destination portion identifier that are the same for data packets in the packet flow. In an embodiment, packet flow information is derived from one or more of the data link layer, IP Layer, Transport Layer and Application Layer of the packet.

Specifically, in the FIG. 1 example, the packet processing unit 140 includes an ingress processing module 150 for ingress processing, a congestion processing module 160 for congestion processing, and an egress processing module 170 for egress processing. In an example, each of the ingress processing module 150, the congestion processing module 160 and the egress processing module 170 is implemented using one or more PPEs 124.

The ingress processing module 150 is configured to perform ingress processing on packets, such as a data packet received from the interface circuitry 112. In an embodiment, ingress processing at processing unit 140 includes one or more selected processing operations such as parsing data from packets, stripping of tunnel headers, making a layer 2 or layer 3 forwarding decision, generating CNP and the like. In some embodiments, additional ingress processing operations are also performed. In an example, for each packet, the ingress processing module 150 parses the packet to obtain values for certain fields, identifies attributes of the packet (e.g., layer 3 attributes, layer 4 attributes), and enables/disables a CNP generation feature based on the attributes. The ingress processing module 150 is configured, in an embodiment, to selectably enable/disable the CNP generation feature for any suitable packet flows or traffic types. In an example, the ingress processing module 150 is configured to enable the CNP generation feature for lossless traffic. In another example, the ingress processing module 150 is configured to enable the CNP generation feature for a protocol that reacts to congestion notification, such as the performance of rate limiting based on a congestion status In another example, when the packet is a CNP packet, the ingress processing module 150 disables the CNP generation.

In an example, the ingress processing module 150 sets a CNP flag (e.g., binary value "1") in metadata associated with the packet to enable the CNP generation feature, or clears the CNP flag (e.g., binary value "0") in the metadata associated with the packet to disable the CNP generation feature.

The ingress processing module 150 performs other suitable operations, such as determines an outgoing network interface based on a destination IP address in a packet (e.g., data packet, a CNP packet) in an example.

The congestion processing module 160 is configured to detect congestion. In an embodiment, the congestion processing module 160 is configured to detect a congestion associated with a data packet, and operate based on the detection. In an example, the congestion processing module 160 is configured to check a status of a queue that is used to queue the data packet, and detect the congestion based on the status of the queue. For example, when fill level of the queue is above a threshold, the congestion processing module 160 detects a congestion; otherwise, no congestion is detected. It is noted that, in another example, the congestion processing module 160 uses other suitable technique to detect the congestion associated with the data packet.

In an embodiment, when the congestion processing module 160 detects the congestion, the congestion processing module 160 triggers generation of a CNP. In an example, the congestion processing module 160 turns on an internal congestion indicator associated with the data packet to indicate the congestion. The congestion indictor is used to trigger the CNP generation by the egress processing module 170. For example, when the internal congestion indicator is turned on and the CNP flag is set, the egress processing module 170 generates a CNP. In an embodiment, the congestion processing module 160 controls a frequency for triggering the CNP generation. In an example, when the congestion processing module 160 detects a congestion associated with a data packet, the congestion processing module 160 turns on the internal congestion indicator. In another example, the congestion processing module 160 includes a counter that counts a number of data packets with congestion detected. When the number reaches a specific value (e.g., 2, 3, 4, . . . ), the congestion processing module 160 turns on the internal congestion indicator and re-starts the counter.

It is noted that, in an example, the congestion processing module 160 triggers other suitable congestion notification, such as an end-to-end congestion notification, and the like. In an embodiment, the congestion processing module 160 triggers a marking for explicit congestion notification (ECN). In an example, the network device 110 includes an ECN enable flag in metadata for a data packet. The network device 110 sets the ECN enable flag to enable ECN marking or clears the ECN enable flag to disable the ECN marking. In an embodiment, the congestion indictor is used to trigger ECN marking by the egress processing module 170. For example, when the internal congestion indicator is turned on and the ECN enable flag is set for a data packet, the egress processing module 170 performs ECN marking on the data packet (e.g., set a specific field in the header of the data packet to a specific value). When the data packet is received by a destination device, the destination device can detect the ECN marking, and include a congestion notification in a returning packet (e.g., acknowledgement packet) to the source device.

The egress processing module 170 is configured to perform egress processing on packets, such as queuing the packets and forwarding packets according to an order, via network interfaces that are determined by the ingress processing module 150. In an embodiment, when a congestion associated with a data packet is detected and the CNP flag associated with the data packet is turned on, the egress processing module 170 generates a CNP based on fields of the data packet. In an example, the egress processing module 170 generates the CNP directly based on fields of the data packet.

In another example, the egress processing module 170 replicates the data packet to generate a replication packet, and modifies the replication packet to form the CNP. The egress processing module 170 extracts a header section of the replication packet, such as the first 128 bytes of the replication packet and creates a CNP packet. In an example, the egress processing module 170 modifies the header section to make the CNP packet destined to the source device. For example, the egress processing module 170 swaps values in a source IP address subfield and a destination IP address subfield in the header section. Further, the egress processing module 170 causes the CNP packet to be indicative of a packet flow that the data packet belongs to. For example, the CNP packet includes the IP protocol, the source IP address, the destination IP address, the source port number and the destination portion number in the data packet. In an embodiment, the egress processing module 170 keeps the UDP header of the data packet in the CNP packet. In another embodiment, the CNP packet includes a field carrying a hash value of a combination (5 tuples) of the IP protocol, the source IP address, the destination IP address, the source port number and the destination portion number in the data packet. The hash value can be used by the source device to identify a specific packet flow.

In an example, the CNP packet is sent back to the ingress processing module 150. The ingress processing module 150 determines a network interface for sending the CNP packet out of the network device 110.

Further, before sending the CNP packet out of the network device 110, the egress processing module 170 finalizes the CNP packet. For example, the egress processing module 170 updates MAC header of the CNP packet. Then, the egress processing module 170 calculates cyclical redundancy check (CRC) codes, such as invariant CRC, variant CRC, and the like, and includes the CRC codes in the CNP packet. Then the egress processing module 170 sends the CNP packet out of the network device 110 via the determined network interface.

During operation, in an example, the first endpoint device 101 sends a first packet flow and a second packet flow to the second endpoint device 102. The first packet flow is for data storage, and is sent according to RoCEv2. The second packet flow is for database query for a voice call session. In an example, data packets in the first packet flow have a first port number (e.g., 4791 for packets according to RoCEv2) in a UDP header, and data packets in the second packet flow have a second port number (e.g., 1433) that is different from the first port number. The network device 105, the network device 110, and the network device 106 form a transmission path between the first endpoint device 101 and the second endpoint device 102 to transmit the first packet flow and the second packet flow.

In an example, the network device 110 receives a first data packet that belongs to the first packet flow, and a second data packet that belongs to the second packet flow. For the first data packet, the ingress processing module 150 extracts L3 and L4 attributes, and enables the CNP generation feature, such as sets a CNP flag, based on the first port number (e.g., 4791 for packets according to RoCEv2). The ingress processing module 150 uses suitable switching or routing technique to determine that the network interface I-3 is the egress for the first data packet and stores an indicator for the network interface I-3 in the metadata associated with the first data packet.

When the congestion processing module 160 detects a congestion associated with the first data packet, the congestion processing module 160 turns on an internal congestion indicator associated with the first data packet to trigger generation of a CNP. Based on the CNP flag and the internal congestion indicator associated with the first data packet, the egress processing module 170 generates a CNP based on the first data packet. In an example, the egress processing module 170 swaps the source IP address and the destination IP address of the data packet to form the CNP packet. For example, the destination IP address subfield in the CNP packet has IP-X, and the source IP address subfield in the CNP packet has IP-Y. In an example, the egress processing module 170 maintains a UDP header in the CNP packet to be the same as the data packet, thus the first packet flow is recognizable based on the UDP header. The egress processing module 170 feedbacks the CNP to the ingress processing module 150. Also, the egress processing module 170 sends the first data packet out via the network interface I-3 according to the metadata.

When the ingress processing module 150 receives the CNP, the ingress processing module 150 uses suitable switching and routing technique to determine that the network interface I-1 is the outgoing network interface for the CNP. Then the egress processing module 170 finalizes the CNP, and sends the CNP out via the network interface I-1. In an example, when the first endpoint device 101 receives the CNP, the first endpoint device 101 identifies the first packet flow and reduces a transmission rate for the first packet flow.

For the second data packet, in an example, the ingress processing module 150 extracts L3 and L4 attributes, and disables the CNP generation feature (clears a CNP flag associated with the second data packet) based on the second port number (e.g., 1433) in the UDP header of the second data packet. The ingress processing module 150 uses suitable switching or routing technique to determine that the network interface I-3 is the outgoing network interface for the second data packet. Even though the second processing module 170 may detect a congestion associated with the second data packet, because the CNP generation feature is disabled, no CNP is generated in response to the second data packet. The second data packet can be dropped or forwarded according to suitable protocol.

Figure 2:
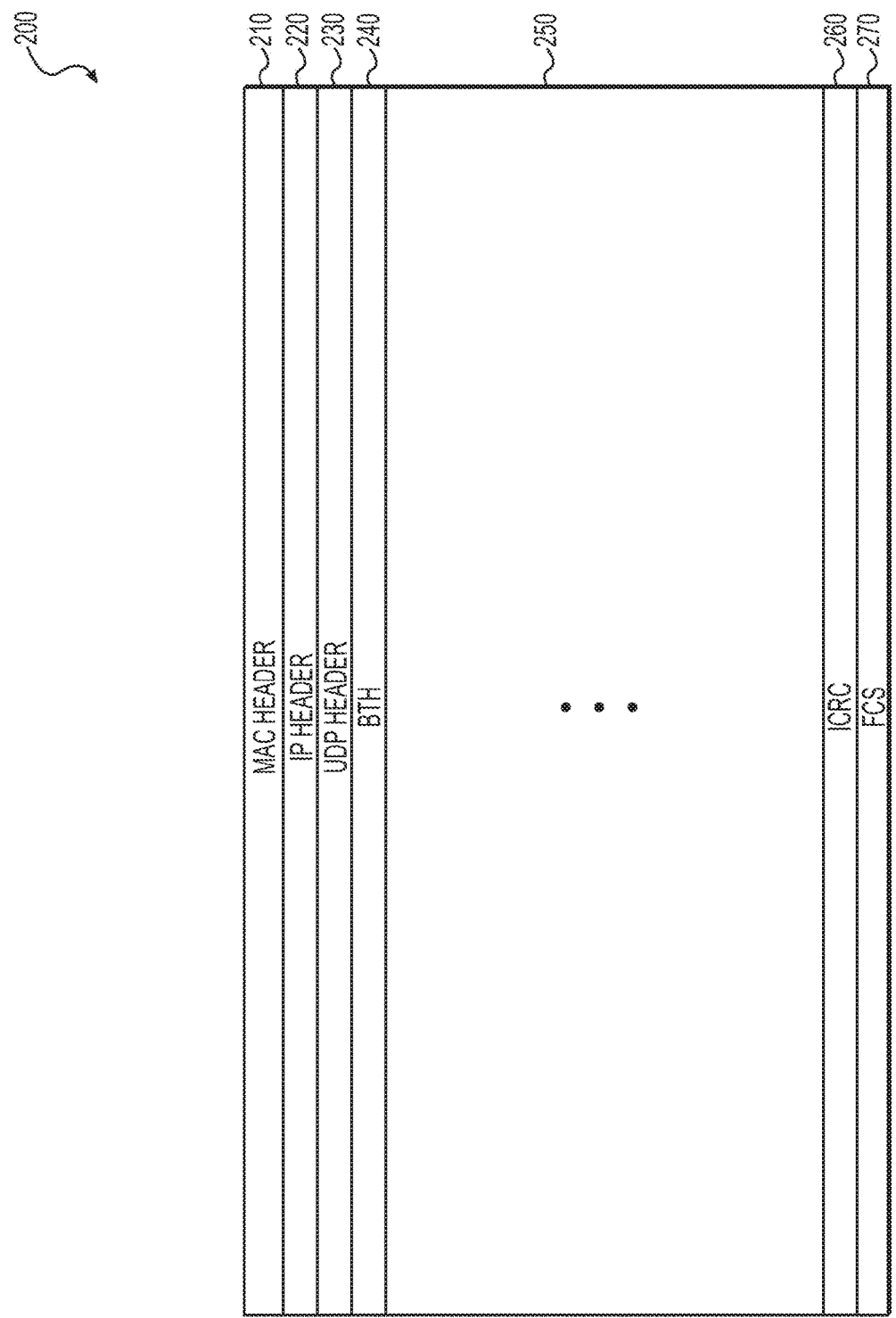
FIG. 2 shows a format 200 of a congestion notification packet according to an embodiment of the disclosure.

FIG. 2 shows a format 200 of a packet according to an embodiment of the disclosure. In an example, the format is used by RoCEv2 network protocol to generate data packets and CNPs. In an example, the packet processing unit 140 is configured to receive a data packet in the format 200, detect a congestion associated with the data packet, generate a CNP in the format 200 and forward the data packet to its destination according to its MAC, IP or other suitable destination address. The format 200 includes a MAC header field 210, an IP header field 220, a UDP header field 230, a base transport header (BTH) field 240, other fields 250, an invariant cyclical redundancy check (ICRC) field 260 and a frame check sequence (FCS) field 270.

In an example, the MAC header field 210 is layer 2 (L2) header that includes various subfields of L2 control information, such as a destination MAC address subfield, a source MAC address subfield and the like for L2 connection. In an example, the MAC header field 210 includes an indicator to indicate an existence of the IP header field 220.

The IP header field 220 is layer 3 (L3) header that includes various subfields of L3 control information, such as an IP protocol subfield (for identifying an IP protocol), a destination IP address subfield for carrying a destination IP address, a source IP address subfield for carrying a source IP address and the like. In an example, the destination IP address subfield specifies IP address of a destination device, and the source IP address subfield specifies IP address of a source device in the L3 network. In an example, the IP header field 220 includes an indicator to indicate an existence of the UDP header 230.

The UDP header field 230 is layer 4 (L4) header that includes subfields of L4 control information, such as a source port identifier subfield, a destination port identifier subfield, and the like. In an example, the source port identifier subfield specifies a service port at a source device, and the destination port identifier subfield specifies a service port at a destination device. A service port is referred to as a software structure that is identified by the port identifier, typically a number. In an example, an application (e.g., a user application) running on a device uses a socket as endpoint for data transmission, and a socket is a combination of IP address of the device and a service port. In an example, a port number is a 16-bit binary value in the range of 0-65535. Some port identifier numbers are registered for well-known services, and are used to identify the services and are indicative of attributes of packet flows under the services. In an example, port number 4791 is reserved for RoCEv2 network protocol. The RoCEv2 network protocol is use by network intensive applications, such as networked storage applications, cluster computing applications, data-center applications, and the like that require lossless traffic. Thus, in an example, port number 4791 is indicative of a packet flow with lossless traffic requirement. In an example, the UDP header 230 includes an indicator that indicates an existence of the BTH header 240.

The BTH field 240 provides control information for endpoint devices to handle the packet. For example, the BTH field 240 includes a destination queue pair (DestQP) subfield, and other suitable subfields. The destination queue pair subfield specifies a pair of send queue and receive queue as end-node for transport services. In an example, some subfields in the BTH field 240 of a CNP have predefined values. For example, an opcode subfield for a CNP is set to binary "10000001", a packet sequence number (PSN) subfield is set to zero, and the like. In an example, the BTH 240 includes a partition key (P_Key) subfield. When the format 200 is used for a data packet, the P_Key subfield indicates a partition of data associated with the payload of the data packet. When a CNP is generated based on the data packet, the P_Key subfield in the CNP is set to be the same as the data packet in an example.

In an example, when the format 200 is used for a data packet, the other fields 250 carry a payload, such as a partition of data for transmission. In another example, when the format 200 is used for a CNP, the other fields 250 includes for example 16 bytes of padding that are set to zero.

The ICRC field 260 is configured to include a value for error-detection of fields that do not change from end-to-end in an example. For example, the value is generated based on calculation of cyclic error-correcting codes over, for example fields 220-250. In the example, the MAC header field 210 is not in the calculation of the value in the ICRC field 260.

The FCS field 270 is configured to include a value for variant CRC that covers fields that change and fields that do not change. For example, the value is generated based on calculation of cyclic error-correcting codes over, for example fields 210-260.

Figure 3:
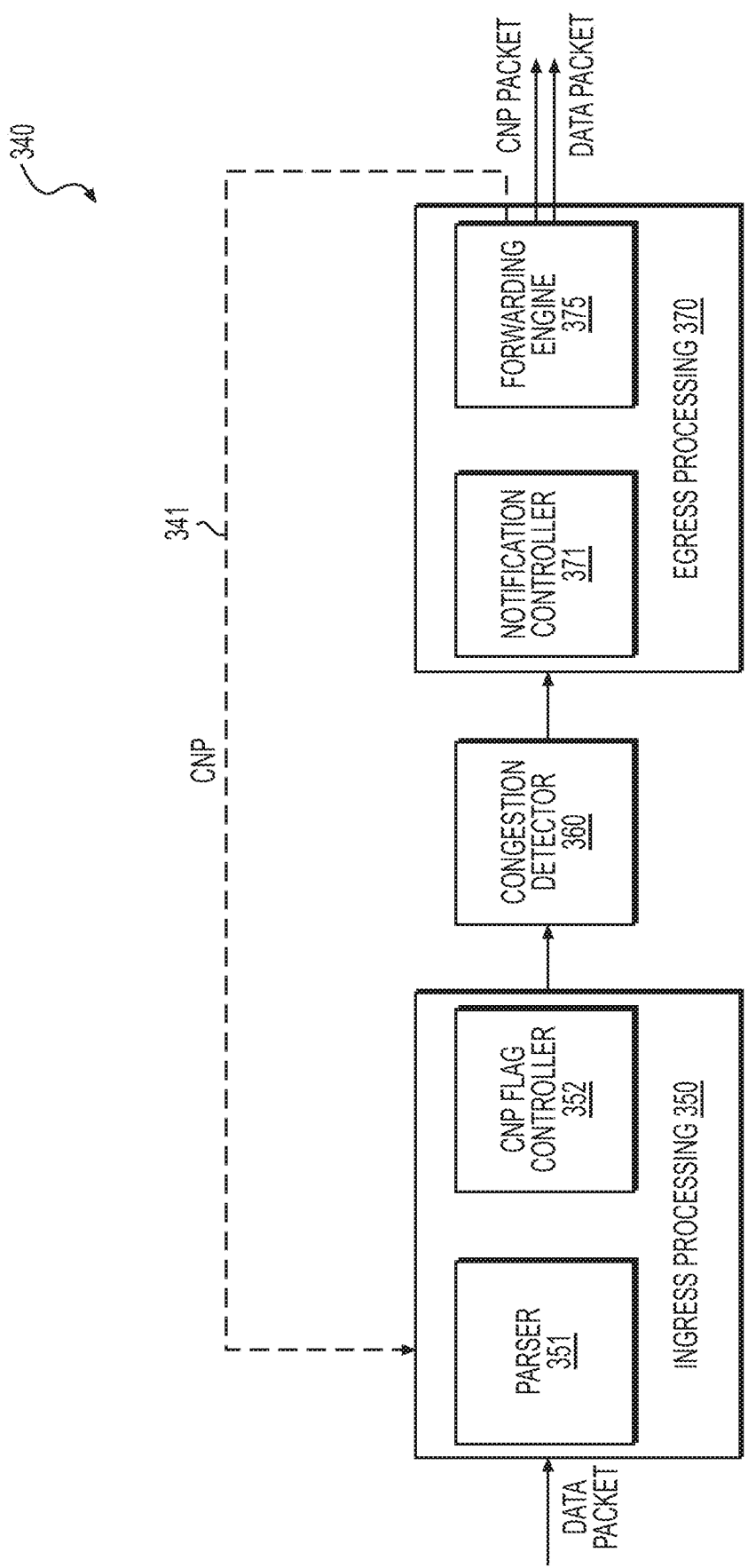
FIG. 3 shows a block diagram of a packet processing unit 340 according to an embodiment of the disclosure.

FIG. 3 shows a block diagram of a packet processing unit 340 according to an embodiment of the disclosure. In an example, the packet processing unit 140 in the FIG. 1 example is implemented using the packet processing unit 340. The packet processing unit 340 includes an ingress processing module 350, a congestion detector 360, and an egress processing module 370. The ingress processing module 350 includes a plurality of components such as a parser 351, a CNP flag controller 352, and the like. The egress processing module 370 includes a plurality of components, such as a notification controller 371, a forwarding engine 375 and the like. In an example, the various components are implemented using circuitry. In another example, the various components are implemented as one or more processors executing software instructions.

The parser 351 is configured to receive a packet and parse the packet. In an example, the parser 351 receives a data packet, such as a data packet in the format 200. The parser 351 parses, for example, the descriptor of the data packet. In an example, the parser 351 parses a MAC header, an IP header, a UDP header, a BTH header and the like, and extracts various attribute information of the data packet, such as an IP protocol (type), a source IP address, a destination IP address, a source port number, destination port number, and the like.

In an embodiment, the ingress processing module 350 suitably determines an outgoing network interface for the data packet based on, for example the destination IP address in the data packet. It is noted that, in an embodiment, the ingress processing module 350 receives a CNP packet that is feedbacked from the egress processing module 370, and determines an outgoing network interface for the CNP packet.

The CNP flag controller 352 is configured to set or clear a CNP flag to enable or disable the CNP generation feature. In an embodiment, the CNP flag controller 352 is configured to enable/disable the CNP generation feature based on a combination of attributes in various layers, such as any of L2, L3, L4, L5, L6 and L7. In an example, the CNP flag controller 352 is configured to identify whether the destination port number of the data packet has value 4791. When the destination port number has value 4791, the data packet belongs to a packet flow that transmits according to the RoCEv2 network protocol. In an example, the packet flow generally requires lossless traffic, thus the CNP flag controller 352 sets the CNP flag associated with the data packet to enable the CNP generation feature that can quickly inform source devices of impending congestion, and cause the source devices to reduce transmission rate in order to avoid packet drops.

In an example, the CNP flag controller 352 clears a CNP flag associated with a CNP packet to disable the CNP generation feature on the CNP packet.

The congestion detector 360 is configured to determine whether a congestion associated with the data packet exists. In an example, the congestion detector 360 detects a status of a queue (e.g., an ingress queue, an egress queue) that is used to queue the data packet. When fill level of the queue is higher than a threshold in an example, the congestion detector 360 detects a congestion associated with the data packet. In an example, when the congestion detector 360 detects a congestion associated with the data packet, the congestion detector 360 turns on an internal congestion indicator associated with the data packet. In another example, the congestion detector 360 is configured to determine a level of congestion and determine a packet ratio proportional to the level of congestion. Further, the congestion detector 360 is configured to turn on the internal congestion indicator according to the packet ratio. For example, a number of packets with the internal congestion indicator being turned on over a total number of packets is about the packet ratio.

The notification controller 371 is configured to control congestion notifications, such as CNP packet generation, ECN marking and the like. In an example, when the CNP flag associated with a data packet is set and the internal congestion indicator associated with the data packet is turned on, the notification controller 371 generates a CNP packet based on the data packet. In another example, when the ECN enable flag associated with a data packet is set and the internal congestion indicator associated with the data packet is turned on, the notification controller 371 performs ECN marking on the data packet.

In an embodiment, the notification controller 371 generates a CNP packet based on a data packet using the format 200. Specifically, in an example, the notification controller 371 puts the MAC address of network device 110 in the destination MAC address subfield of the MAC header for the CNP packet. Further, the notification controller 371 fills in the source IP address subfield and the destination IP address subfield of the CNP packet based on a swap of the source IP address and the destination IP address of the data packet. For example, the notification controller 371 puts the source IP address of the data packet into the destination IP address subfield in the CNP packet, and puts the destination IP address of the data packet into the source IP address subfield in the CNP packet. In addition, in an example, the notification controller 371 uses the same UDP header as the data packet in the CNP or suitably swaps the source port number and the destination port number in an example.

In an embodiment, the notification controller 371 also updates BTH field. In an example, the notification controller 371 is configured to take the queue pair number in the data packet to be the destination queue pair in the CNP. Further, in an example, the notification controller 371 sets some fields in the BTH field to predefined values for CNP, for examples sets an opcode subfield of the CNP to binary "10000001", sets a PSN subfield to zero, and the like. In an example, the CNP modifier 371 copies the P_Key subfield from the data packet to the CNP packet.

In an embodiment, the notification controller 371 is configured not to include a payload in the CNP packet. Then, the notification controller 371 calculates ICRC. Further, the notification controller 371 calculates FCS and finalizes the CNP.

The forwarding engine 375 is configured to suitably forward a data packet to a network interface to send the data packet out. Further, in an example, when the notification controller 371 forms a CNP packet, the forwarding engine 375 sends the CNP packet to the ingress processing module 350 (e.g., via path 341).

It is noted that, in an embodiment, the forwarding engine 375 is configured to forward the data packet without waiting for the notification controller 371 to generate the CNP packet. In an example, the forwarding engine 375 generates a replication packet of the data packet, and forwards the data packet to a determined network interface to send the data packet out. The notification controller 371 then generates the CNP packet based on the replication packet.

Figure 4:
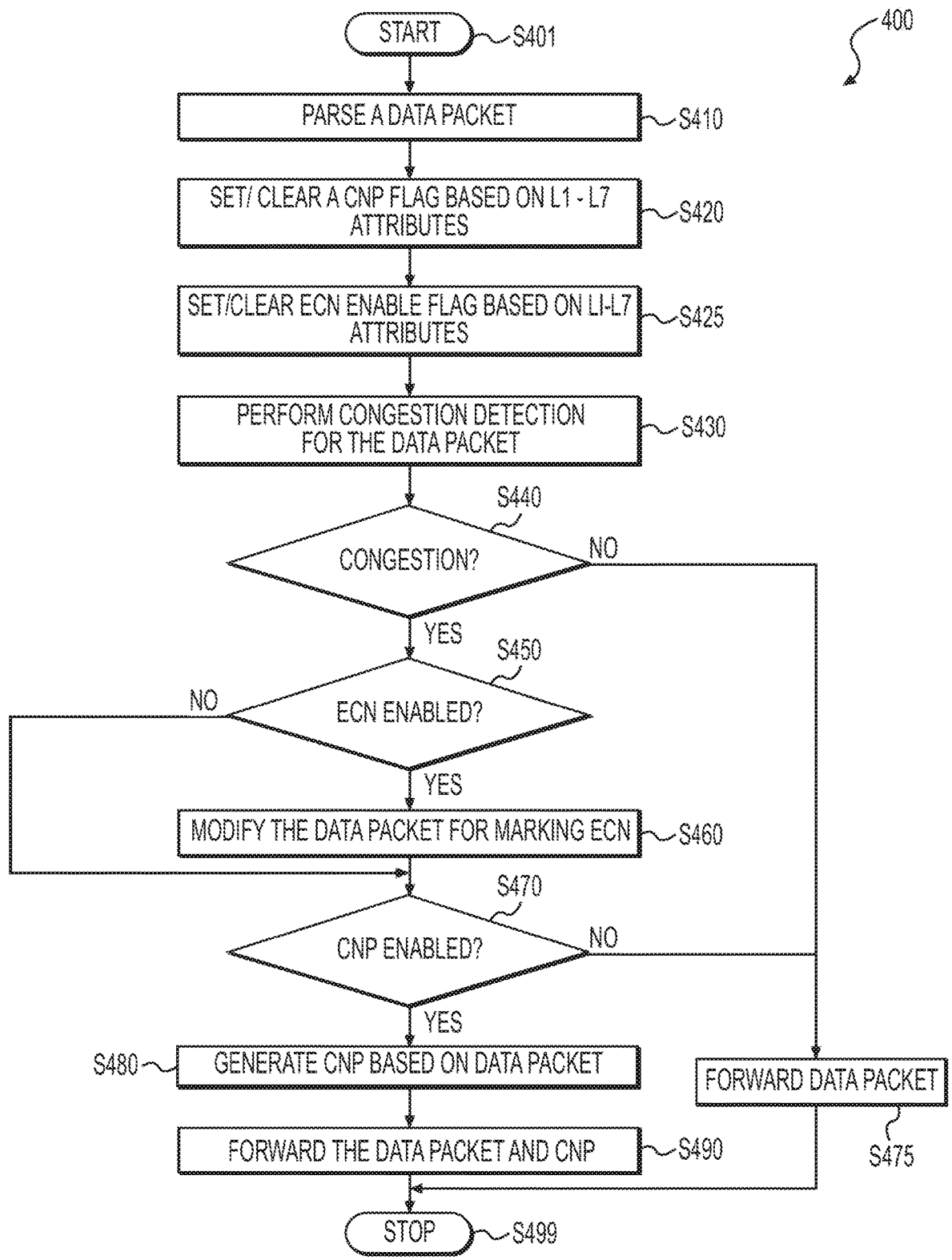
FIG. 4 shows a flow chart outlining a process 400 according to an embodiment of the disclosure.

FIG. 4 shows a flow chart outlining a process 400 according to an embodiment of the disclosure. In an example, the process 400 is executed by a network device, such as the network device 110 in the FIG. 1 example. The process starts at S401 and proceeds to S410.

At S410, a data packet is received and parsed by the network device. In the FIG. 1 example, the network device 110 receives a data packet from, for example, the network interface I-1.

At S420, the network device enables or disables the CNP generation feature based on a combination of attributes from any of Layer1-Layer 7, specifically layer 3 and layer 4 attributes in an embodiment. In an example, when the attributes indicate that the data packet belongs to a specific packet flow that desires a fast rate control (e.g., requires lossless traffic), the network device sets a CNP flag associated with the data packet to enable the CNP generation feature.

At S425, the network device enables or disables an ECN enable flag based on a combination of attributes from any of L1-L7, specially layer 3 and layer 4 attributes in an embodiment. The ECN enable flag is used to enable/disable ECN marking.

At S430, the network device performs a congestion detection based on the data packet. In an example, the network device detects that a queue that is used to queue the data packet, for example upon ingress or egress, is becoming full or almost full, thus the network device turns on an internal congestion indicator associated with the data packet to indicate an existence of a congestion associated with the data packet.

At S440, when the internal congestion indicator is turned on, the process proceeds to S450; otherwise, the process proceeds to S475.

At S450, when the ECN marking is enabled (e.g., the ECN enable flag is set), the process proceeds to S460; otherwise, the process proceeds to S470.

At S460, the network device sets a mark in the IP header of the data packet in order to signal the congestion to the destination device for the data packet.

At S470, when the CNP feature is enabled (e.g., the CNP flag is set), the process proceeds to S480; otherwise, the process proceeds to S475.

At S475, the data packet is forwarded. Then the process proceeds to S499 and terminates.

At S480, the network device generates a CNP packet based on the data packet. In an example, the CNP packet includes layer 3 and layer 4 attributes of the data packet, and is indicative of the packet flow that the data packet belongs to. The CNP packet is destined to the source device of the data packet. It is noted that the network device can generate the CNP packet directly based on the data packet or based on a replication packet of the data packet.

At S490, the data packet and the CNP packet are forwarded. Then the process proceeds to S499 and terminates.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A network device, comprising:
   interface circuitry configured to receive incoming packets from a network and transmit outgoing packets to the network via interfaces; and
   packet processing circuitry configured to:

detect a congestion associated with packets that are sent from a source device originating a packet flow, the packets being forwarded by the network device to a destination device in the network;

generate a notification packet that is destined to the source device, the notification packet being indicative of the packet flow to which the packets belong and presence of congestion, and the notification packet being generated to include an identifier corresponding to the interface associated with the packet flow;

transmit the packets to the destination device via a first interface; and send to the source device originating the packet flow, via a second interface the notification packet indicative of the packet flow and of the presence of congestion to cause the source device to reduce a packet transmission rate of the packet flow.

2. The network device of claim 1, wherein the packet processing circuitry is further configured to parse a packet of the packets, and enable a feature for generating the notification packet based on header information of the packet.

3. The network device of claim 2, wherein the packet processing circuitry is further configured to enable the feature based on one or more fields in a header of the packet.

4. The network device of claim 2, wherein the packet processing circuitry is further configured to set a flag to enable the feature for generating the notification packet.

5. The network device of claim 2, wherein the packet processing circuitry is configured to manipulate header fields of the packet to generate the notification packet.

6. The network device of claim 5, wherein the packet processing circuitry is further configured to:
swap values in a source Internet protocol (IP) address field and a destination IP address field of the packet to form a source IP address field and a destination IP address field of the notification packet; and
add one or more fields in a header of the packet into the notification packet.

7. The network device of claim 6, wherein the packet processing circuitry is further configured to:
fill a media access control (MAC) address of the network device in a destination MAC address field of the notification packet.

8. The network device of claim 6, wherein the packet processing circuitry is further configured to:
include a congestion notification in the packet to form an outgoing packet; and
send the outgoing packet to the destination device to inform the destination device of congestion being present on a path from the source device to the destination device.

9. The network device of claim 1, wherein the packet processing circuitry is configured to send the notification packet to cause the source device to identify the packet flow from a plurality of packet flows and to reduce the packet transmission rate of the identified packet flow.

10. The network device of claim 1, wherein the notification packet is generated based on a count of a number of the packets associated with the congestion reaching a specific value greater than two.

11. A network device, comprising:
interface circuitry configured to receive incoming packets from a network and transmit outgoing packets to the network via interfaces; and
packet processing circuitry configured to:
detect a congestion associated with packets that are sent from a source device originating a packet flow, the packets being forwarded by the network device to a destination device in the network;
generate a notification packet that is destined to the source device, the notification packet being indicative of the packet flow to which the packets belong and the presence of congestion;
transmit the packets to the destination device via a first interface; and
send to the source device originating the packet flow, via a second interface the notification packet indicative of the packet flow and of the presence of congestion to cause the source device to reduce a packet transmission rate of the packet flow,
wherein the packet processing circuitry is further configured to:
generate a replication packet of a packet of the packets; and
generate the notification packet based on the replication packet.

12. The network device of claim 11, wherein the packet processing circuitry is further configured to determine the second interface on which to send the notification packet.

13. A method for congestion notification in a network, comprising:
receiving, at a network device, packets that are sent from a source device originating a packet flow, the packets to be forwarded by the network device to a destination device in the network via interfaces;
detecting a congestion associated with the packets;
generating a notification packet that is destined to the source device, the notification packet being indicative of the packet flow to which the packets belongs and presence of congestion, and the notification packet being generated to include an identifier corresponding to the interface associated with the packet flow;
transmitting the packets to the destination device via a first interface; and
sending to the source device originating the packet flow, via a second interface, the notification packet indicative of the packet flow and of the presence of congestion, to cause the source device to reduce a packet transmission rate of the packet flow.

14. The method of claim 13, further comprising:
parsing a packet of the packets; and
enabling a feature for generating the notification packet based on header information of the packet.

15. The method of claim 14, wherein enabling the feature for generating the notification packet based on the header information of the packet further comprises:
enabling the feature for generating the notification packet based on one or more fields in a header of the packet.

16. The method of claim 14, wherein enabling the feature for generating the notification packet based on the header information of the packet further comprises:
setting a flag to enable the feature for generating the notification packet.

17. The method of claim 13, wherein generating the notification packet that is destined to the source device comprises:
swapping values in a source Internet protocol (IP) address field and a destination IP address field of a packet of the packets to form a source IP address field and a destination IP address field of the notification packet.

18. The method of claim 13, wherein generating the notification packet that is destined to the source device comprises:

adding one or more fields in a header of a replication packet to indicate a specific flow.

19. The method of claim 13, wherein generating the notification packet that is destined to the source device comprises:
filling a media access control (MAC) address of the network device in a destination MAC address field of the notification packet.

20. The method of claim 13, further comprising:
including a congestion notification in a packet to form an outgoing packet; and
sending the outgoing packet to the destination device to inform the destination device of the congestion being present on a path from the source device to the destination device.

21. The method of claim 13, wherein sending the notification packet to cause the source device to identify the packet flow from a plurality of packet flows and to reduce the packet transmission rate of the identified packet flow.

22. The method of claim 13, wherein generating the notification packet comprises:
counting a number of the packets associated with the congestion; and
generating the notification packet based on the counted number reaching a specific value greater than two.

23. A method for congestion notification in a network, comprising:
receiving, at a network device, packets that are sent from a source device originating a packet flow, the packets to be forwarded by the network device to a destination device in the network;
detecting a congestion associated with the packets;
generating a notification packet that is destined to the source device, the notification packet being indicative of the packet flow to which the packets belongs and the presence of congestion;
transmitting the packets to the destination device via a first interface; and
sending to the source device originating the packet flow, via a second interface, the notification packet indicative of the packet flow and of the presence of congestion, to cause the source device to reduce a packet transmission rate of the packet flow,
wherein generating the notification packet that is destined to the source device comprises:
generating a replication packet based on a packet of the packets; and
generating the notification packet based on the replication packet.

* * * * *